United States Patent [19]

Lederman et al.

[11] Patent Number: 4,712,661
[45] Date of Patent: Dec. 15, 1987

[54] OVERRUNNING CLUTCH CAGE

[75] Inventors: Frederick E. Lederman, Sandusky; Donald J. King, Huron, both of Ohio

[73] Assignee: General Motors Corporation, Detroit, Mich.

[21] Appl. No.: 863,871

[22] Filed: May 16, 1986

[51] Int. Cl.⁴ .................. F16D 13/75; F16D 41/07
[52] U.S. Cl. ............................... 192/45; 192/44; 188/82.84; 384/557; 384/578
[58] Field of Search ............... 192/45, 41 A, 44, 45.1; 384/557, 576, 578, 579, 905; 188/82.8, 82.84

[56] References Cited

U.S. PATENT DOCUMENTS

| | | | |
|---|---|---|---|
| 2,969,267 | 1/1961 | Gothberg | 384/580 |
| 3,881,790 | 5/1975 | Ryanen | 384/576 |
| 3,917,036 | 11/1975 | Johnson et al. | 192/45 |
| 3,937,312 | 2/1976 | Gehrke | 192/45 |
| 4,054,192 | 10/1977 | Johnson | 192/45 |
| 4,185,724 | 1/1980 | Kitchin | 192/45 |
| 4,570,762 | 2/1986 | Husmann | 188/82.84 |

FOREIGN PATENT DOCUMENTS 1264167   3/1968  Fed. Rep. of Germany .
2719685  11/1978  Fed. Rep. of Germany ........ 192/45

Primary Examiner—Rodney H. Bonck
Assistant Examiner—David A. Testardi
Attorney, Agent, or Firm—Patrick M. Griffin

[57] ABSTRACT

An overrunning clutch cage molded of a plastic material with a greater differential of expansion is provided with a circumferentially spaced plurality of cage sections connected by alternating connector members that are sufficiently axially spaced and sufficiently flexible to allow the cage sections to move freely relative to one another, and thus conform to an annular space between clutch races with changing temperature without binding.

1 Claim, 7 Drawing Figures

Fig. 1

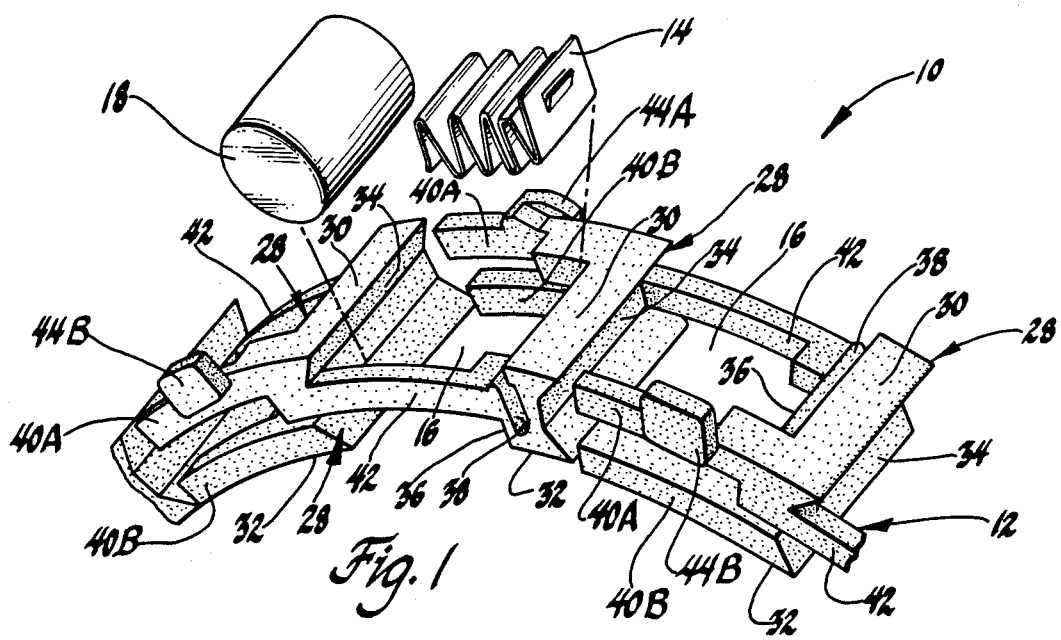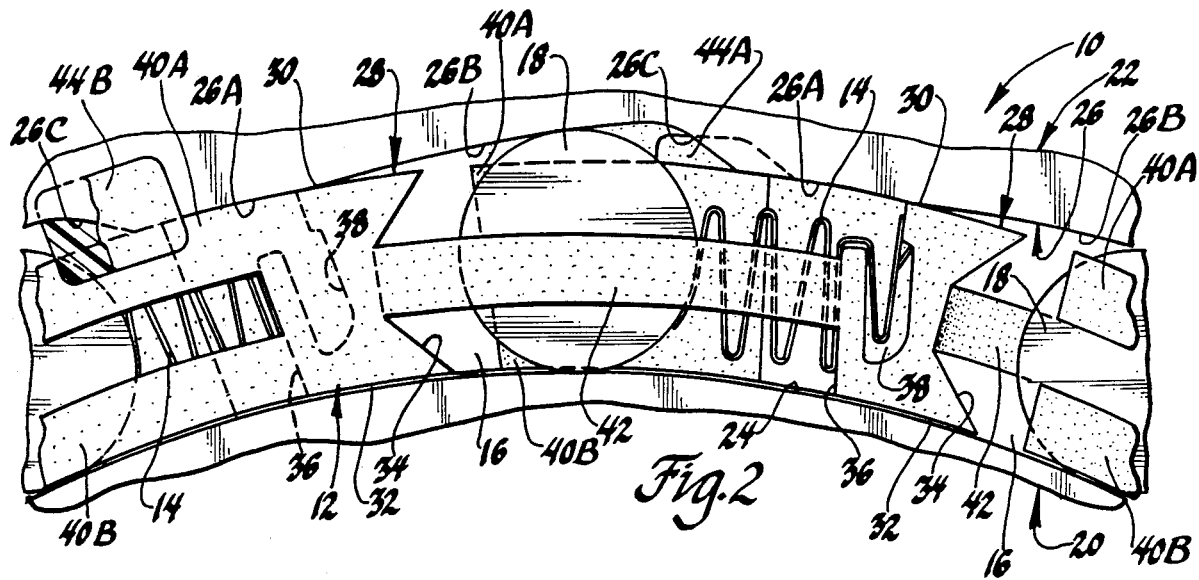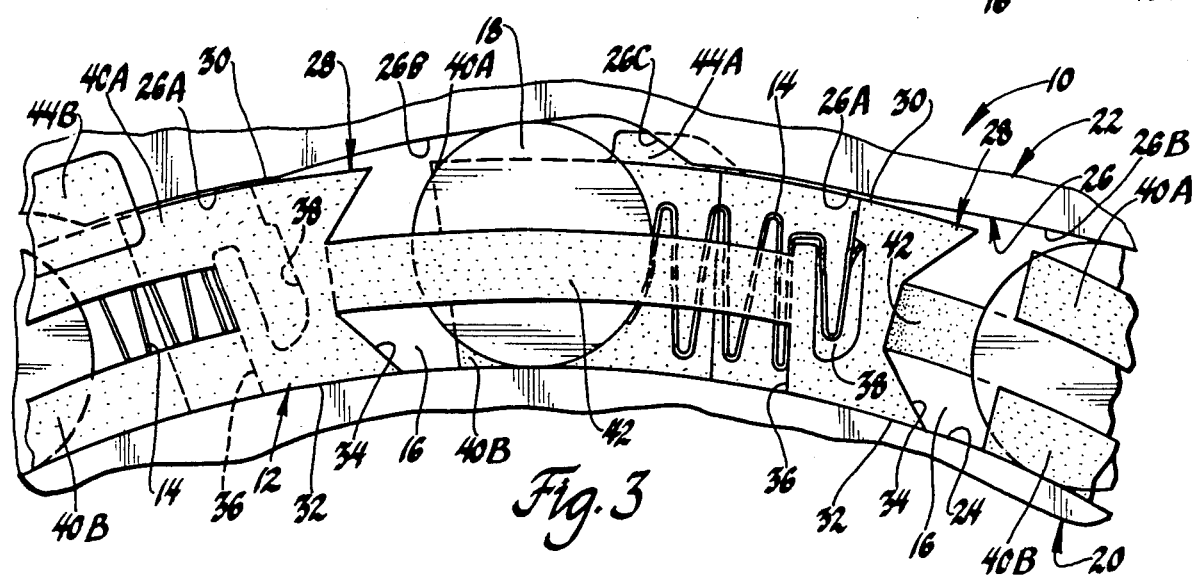

OVERRUNNING CLUTCH CAGE

This invention relates to overrunning clutches in general and specifically to an improved cage for an overrunning clutch of the type that is adapted to fit closely within an annular space between confronting surfaces of a pair of rotatable members.

BACKGROUND OF THE INVENTION

Overrunning clutches are widely used in order to allow relative rotation in one direction only between a pair of rotatable members, such as clutch races. Such overrunning clutches generally include a plurality of wedging elements, such as cylindrical rollers, and a cage that provides the basic structural framework of the clutch, retaining the wedging elements as well as providing a mount for energizing springs. While the wedging elements and the races are metal, it is often preferred that the cage itself be made of a moldable plastic material. This is particularly true if the cage is what is known as a concentric control cage. Such a cage includes support portions, often called journal blocks, that fit very closely within the annular space defined by the confronting surfaces of the races. Thus, when the clutch overruns, selected surfaces of the support portions may ride upon the surface of the more rapidly rotating race, and the races will thus be maintained in coaxial relation to one another without the need for separate bearings. Even with clutch cages that are not concentric control cages, the cage will generally fit closely within the annular space, because the cage will be tied to one of the races, unlike a bearing cage.

There are drawbacks, however, to forming a cage of moldable plastic material. The most serious drawback is that the plastic material generally has a thermal coefficient of expansion and contraction far greater than that of the metal races. Thus, as the metal races expand or contract with increasing or decreasing temperature, the cage will attempt to expand or contract to a significantly greater degree. However, since the cage is confined by definition within the annular space, the cage may be forced into the outer race as the temperature increases, or into the inner race as temperature decreases. This potentially may cause the cage to buckle into the race that it is tied to, or cause the surface of the cage that is supposed to slide on the other race to bind. Another potential drawback is that plastic will generally have less wear resistance than the metal wedging elements. In the case of cylindrical rollers, the ends of those rollers may potentially wear on the side walls of a plastic cage, especially where misalignment between the races may cause roller skew. However, the benefits of plastic, such as its moldability, light weight, and desirable frictional characteristics all dictate that it be used wherever possible. Therefore, it is worthwhile to attempt to overcome these drawbacks.

The U.S. Pat. No. 4,570,762 to Husmann discloses a roller clutch cage that attempts to solve the problem of thermal coefficient differential referred to above. It is known to increase circumferential flexibility of a bearing cage by adding alternating relieved portions to the side rails thereof, as shown in the foreign patent document No. 1264167, dated 3/1968, from the Federal Republic of Germany. Husmann takes a different approach, however. The cage there disclosed, as seen in FIG. 2, has axially spaced side rails 4 and 5, each of which has a circumferentially spaced series of so called resilient portions 26 and 27. These resilient portions, it is claimed, facilitate the circumferential elastic deformation of the cage, and thereby permit displacement of the individual cage chambers relative to one another. However, it is quite clear from an analysis of an actual sample of that cage that it is in fact not noticably more flexible than a conventional cage with solid side rails. This is because each of the side rails, despite the presence of the so called resilient sections, still is circumferentially continuous. There is still plastic material continuously all the way around each side rail. Therefore, both side rails will still respond to temperature changes essentially as would a conventional side rail. There are other drawbacks to the Husmann design, as well. The embodiment disclosed has two parts, and is not moldable as a unitary structure. While it is recited that the cage could be molded as a unitary structure with "somewhat greater molding and machine effort", it is quite clear that the number of movable molding elements necessary to mold such a cage would have to be equal to at least the number of individual cage pockets plus two. This is impractical, but a multi-part cage is undesirable as well. Furthermore, the cage pockets of the Husmann design are all plastic, and therefore subject to excessive roller wear in certain applications.

SUMMARY OF THE INVENTION

The subject invention provides an overrunning roller clutch for use with clutch races of the type described above which overcomes the noted drawbacks. A unitary plastic cage is provided which has greatly enhanced flexibility, thereby permitting much better conformation with temperature change, but which is moldable with a single pair of axially parting mold elements. In addition, another embodiment is disclosed in which metal end rings cooperate with the cage to provide metal armored retention pockets for the cylindrical rollers, but without interfering with the enhanced flexibility.

In a first embodiment of the cage, the improved clutch cage includes a plurality of circumferentially spaced cage sections molded of a suitable plastic material with adjacent surfaces. The cage sections are interconnected by a plurality of alternating spaced connector members, molded of the same material, which extend circumferentially between the adjacent cage section surfaces. The connector members, as well as the adjacent cage section surfaces, contain no return bends relative to the axis of the cage. Therefore, the entire cage may be easily molded as a unitary structure by a single pair of mold elements that part along the cage axis. The alternating connector members are sufficiently flexible and are sufficiently axially spaced from one another so that, as the cage either expands or contracts with changing temperature, the cage sections may in turn move circumferentially away from, or toward, one another. The cage sections may so move with sufficient freedom that the cage may conform to the annular space between the clutch races without forcing the cage sections strongly into either of the confronting race surfaces.

In a second embodiment, additional structure is added to cooperatively provide armored roller retention pockets. In the second embodiment, the circumferentially spaced cage sections comprise support portions adapted to fit closely within the annular space between the confronting surface of the races. The cage sections are molded so as to include latch portions, and a pair of metal end rings are adapted to be joined to the cage in axially spaced relation by being snap fitted into the latch portions. The metal rings thereby form, in cooperation with the cage sections, a plurality of metal armored retention pockets for the rollers, providing excellent wear resistance. The latch portions provide a slip fit such that the metal end rings do not interfere with the circumferential movement of the cage sections, and thereby do not interfere with the conformation of the cage to the annular space between the races. The second embodiment may be used in applications where there is more potential wear of the wedging elements against the cage.

It is, therefore, a basic object of the invention to provide an improved cage for an overrunning clutch the type that is adapted to fit closely within an annular space between confronting surfaces of a pair of rotatable members and in which the material of the cage has a thermal coefficient of expansion and contraction different from the rotatable members.

It is another object of the invention to provide an improved cage for such an overrunning clutch which is both easily moldable as a unitary structure as well as having an enhanced ability to conform to the annular space with changing temperature without binding, in spite of the different coefficient.

It is yet another object of the invention to provide such an improved cage having a plurality of circumferentially spaced cage sections which are interconnected by a plurality of alternating spaced connector members that are both sufficiently flexible and sufficiently axially spaced from one another so that, as the cage expands or contracts with changing temperature, the cage sections may in turn move circumferentially away from or toward one another with sufficient freedom that the cage will conform to the annular space without forcing the cage sections strongly into either of the confronting surfaces, thereby avoiding binding on either rotatable member.

It is still another object of the invention to provide such an improved cage which also includes metal end rings joined to the cage in such a way as to cooperatively provide metal armored wedging element retention pockets without interfering with the enhanced conformation of the cage.

DESCRIPTION OF THE PREFERRED EMBODIMENT

These and other objects and features of the subject invention will appear from the following written description and drawings in which:

FIG. 1 is a perspective of a portion of the first embodiment of the invention;

FIG. 2 is a side view showing the same portion of the cage as in FIG. 1, but located in the annular space between a pair of metal races and at an average temperature;

FIG. 3 is a view showing the same structure as FIG. 2, but at a significantly colder temperature;

Figure 5:
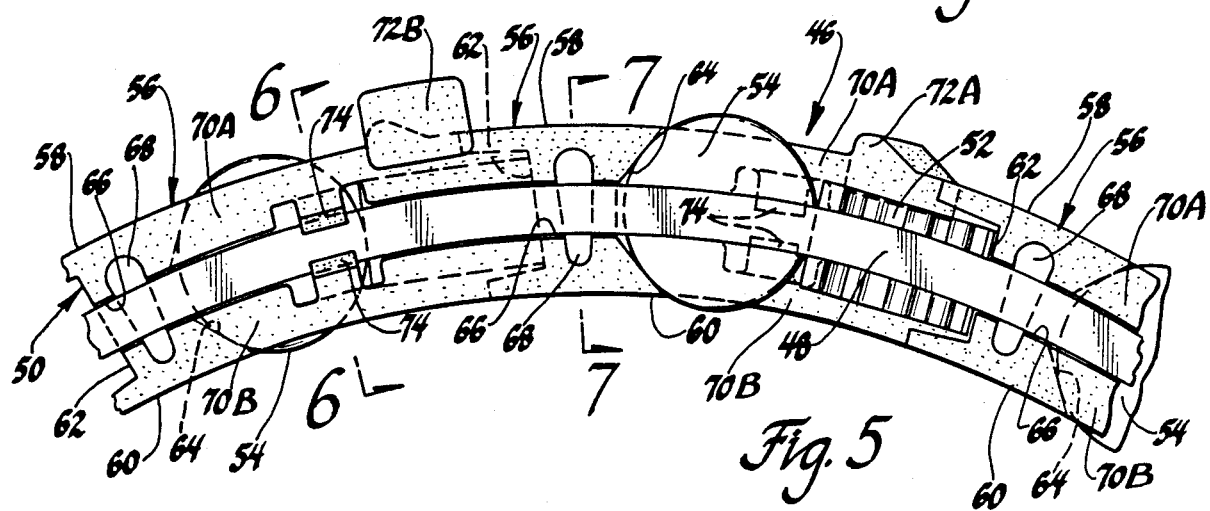
FIG. 5 is a side view of the same portion of the second embodiment, but with the end rings snapped into place.
Figure 6:
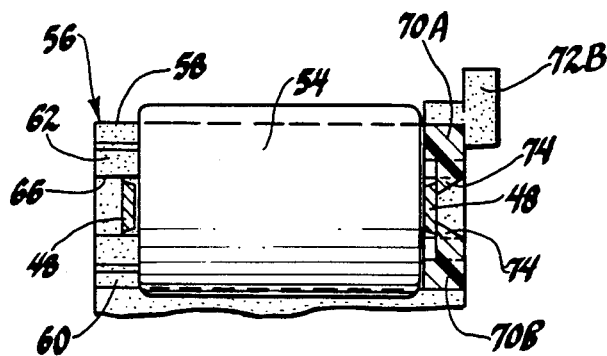
Figure 7:
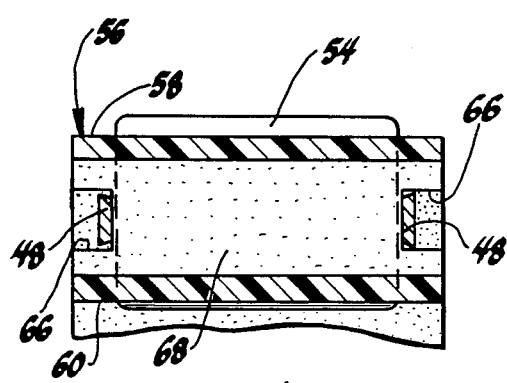

FIG. 6 in a cross-sectional view along the line 6—6 of FIG. 5;

FIG. 7 is a cross-sectional view along the line 7—7 of FIG. 5.

Referring first to FIGS. 1 and 2, a first embodiment of the overrunning clutch of the invention is designated generally at 10. A cage, designated generally at 12, provides both a mount for a plurality of energizing springs 14 and a like number of circumferentially spaced retention pockets 16 for metal wedging elements, which are cylindrical rollers 18. The clutch 10 allows relative rotation in one direction only between a pair of rotatable members, best seen in FIG. 2. The rotatable members as disclosed are an inner race, designated generally at 20, and a coaxial outer race, designated generally at 22, and often referred to as the cam race. Inner race 20 includes a cylindrical surface 24, while the outer race 22 includes a generally cylindrical surface designated generally at 26. Surface 26 is specifically comprised of a plurality of circumferentially spaced cylindrical portions 26A and integral intermediate sloped cam surfaces 26B, which are in turn each joined to the next adjacent cylindrical portion 26A by an integral and oppositely sloped surface 26C, generally referred to as a cam hook surface. The cylindrical portions 26A, all lie in a common circle. Therefore, the confronting surfaces 24 and 26 form a generally annular space therebetween. If that annular space is maintained, then the inner and outer races 20 and 22 will in turn be maintained in coaxial relation. The cage 12 of the invention does so, as will appear below.

Still referring to FIGS. 1 and 2, cage 12 is comprised of a plurality of cage sections, sixteen in all for the embodiment illustrated, corresponding to the number of cylindrical rollers 18 and the number of cam surfaces 26B. Only three sections are illustrated, as they repeat all the way around. The cage sections are in turn each comprised of a cross bar designated generally at 28, each of which has a pair of generally arcuate and radially spaced upper and lower surfaces 30 and 32 respectively. Each cross bar 28 has an axial length substantially equal to the axial depth of the annular space between the races 20 and 22 referred to above, and a radial thickness substantially equal to the radial thickness of the annular space. This thickness, and the shape of the surfaces 30 and 32, allows cage 12 to operate as what is known as a concentric control cage, as will be more fully described below. Each cross bar 28 also includes a sloped side groove formed into one circumferentially facing side 34 thereof and a generally flat opposed circumferentially facing side 36. The sides 34 and 36 of adjacent cross bars 28 face one another respectively in adjacent pairs, and their surfaces are configured so as to have no return bends relative to the axis of the cage 12. By no return bends, it is meant that, as seen in the axial direction, the surfaces of sides 34 and 36 have no undercuts, that is, they are smooth and without any concave or convex local discontinuities that would interfere with the molding process. Each cross bar 28 also includes a notch 38 formed behind the flat side 36 into which a spring 14 may be fitted. In addition, for the embodiment 10 disclosed, each cage section also includes a double side rail 40A and 40B, which extend from alternating ends of the cross bar sides 36 circumferentially toward, but terminating short of engagement with, the surface of the adjacent cross bar sides 34. This leaves a plurality of alternating gaps around the circumference of each axial side the cage 12, which operate as more fully described below.

Referring now to FIG. 1, the cage sections comprised by each cross bar 28 and its respective double side rails 40A and 40B are interconnected to one another by connector members 42. The connector members 42 extend circumferentially between each pair of adjacent cross bar sides 34 and 36, alternating with and axially spaced from the double side rails 40A and 40B. Thus, each connector member 42, double side rail 40A and 40B, and each pair of facing sides 34 and 36 comprise a roller pocket 16. The connector members 42 are also generally arcuate in shape, and have a diameter such that, as one looks along the axis of cage 12, they appear to fit between the double side rails 40A and 40B. As with the surfaces of the pairs of facing sides 34 and 36, the surfaces of the connector members 42 also have no return bends relative to the axis of the cage 12. This configuration of surfaces allows the entire cage 12 to be molded as a unitary structure by a single pair of mold elements that part along the axis of cage 12. It will also be noted that the notches 38 open through alternate axial ends of the cross bars 28, also allowing them to be molded by the same pair of mold elements. This ease of moldability is a great advantage, especially in combination with the greatly enhanced flexibility of the cage 12. The connector members 42 are significantly thinner than the cross bars 28 that they interconnect. In addition, the connector members 42 are axially spaced from one another. This combination of flexibility and axial spacing allows the individual cage sections to move freely relative to one another, even though cage 12 is moldable as a unitary structure. This flexibility will be fully described below. Finally, molded integrally with the top rails 40A are a plurality of alternating reaction ears 44A and 44B, the ears 44A having a rounded off outer surface, while the alternating reaction ears 44B have a more squared off outer surface. These allow cage 12 to be installed between the races 20 and 22 and will be described next.

Referring next to FIG. 2, cage 12 is installed by pushing it into the annular space, sliding the reaction ears 44A along the cam hook surfaces 26C. Once the reaction ears 44B move against a radial face of the outer race 22, the cage 12 is then indexed or twisted clockwise, bringing the reaction ears 44A and 44B into contact with opposite axial edges of adjacent cam hook surfaces 26C. This ties the cage 12 to the outer race 22 so that it will rotate therewith. It will be noted that the upper surface 30 of each cross bar 28 is located in close engagement with a cylindrical part 26A of the outer race surface 26. The lower surface 32 of each cross bar 28 is located with a slight spacing from the cylindrical surface 24 of the inner race 20. These are the clearances that would exist at an average or moderate temperature. The concentric control of cage 12 is provided as follows. When the clutch overruns, which occurs when the outer race 22 runs faster in the counterclockwise direction than does the inner race 20, the cross bar lower surfaces 32 will ride upon and slide over the inner race surface 24. Cage 12 is molded of a material with good frictional characteristics, and because of the close clearance between the surfaces 32 and surface 24, it will be seen that the races 20 and 22 are thereby maintained concentric or, more properly, coaxial. When the clutch 10 overruns, of course, the reaction ears 44A and 44B assure that the cage 12 is carried with the outer race 22.

The close clearance referred to above, which gives the concentric control, also creates a potential problem, however. The plastic material of which cage 12 is molded generally has a far greater coefficient of expansion or contraction than do the metal races 20 and 22. Because of this differential, as the temperature rose significantly, the outside diameter of the cage 12 would, in a conventional cage, tend to expand radially outwardly more than the surface 26 of the outer race 22. This could cause binding of the reaction ears 44A and 44B against the cam hook surfaces 26C, or an excessive forcing of the cross bar surfaces 30 into the cylindrical portions 26A, in a conventional cage. Even though the cage 12 need not slide relative to the outer race surface 26, there could be potential buckling of the cage 12. In addition, as the temperature fell significantly, the lower surfaces 32 of the cross bars 28 would tend to contract radially inwardly more than the cylindrical surface 24 of inner race 20, in a conventional cage. This could potentially cause binding of the lower surfaces 32 on the cylindrical surface 24, and jeopardize the operation of the clutch 10 in its overrunning mode described above.

Referring now to FIG. 3, which illustrates the situation at a significantly colder temperature, it will be seen how cage 12 avoids the potential problems discussed above. As cage 12 shrinks and contracts with the colder temperature, the cage sections may move circumferentially away from one another. More specifically, the cross bars 28 may bend outwardly away from one another, about the flexible and alternating connecting members 42. The flexing of the cross bars 28 about the connector members 42 will not affect the positioning of the rollers 18, which is really determined by the surfaces 26B and 24. Consequent to this bending, the gaps described above will widen, as may be seen by comparing FIG. 3 to 2. The clearance between the cross bar lower surfaces 32 and the inner race cylindrical surface 24 also will decrease, but those surfaces will not be forced into each other strongly, and certainly not as strongly as would be the case with a conventional cage. Therefore, the cage 12 may conform to the annular space within which it is confined without binding. The reverse would occur for the case of increasing temperature, though that is not illustrated. In that case, the clearance between the cross bar lower surfaces 32 and the inner race cylindrical surface 24 would actually tend to increase slightly, because of the tendency of the cage 12 to expand more than the metal, but not enough to jeopardize the concentric control. The cross bar upper surfaces 30 would expand outwardly, toward the outer race surfaces 26A. However, the cross bars 28 could then flex toward one another about the connector members 42, and the gaps would narrow. The cross bars 28 could so move freely enough to avoid buckling of the cage 12 into the surface 26. Thus, the cage 12 can tolerate temperature increases or decreases, and conform to the annular space without binding in either direction.

Figure 4:
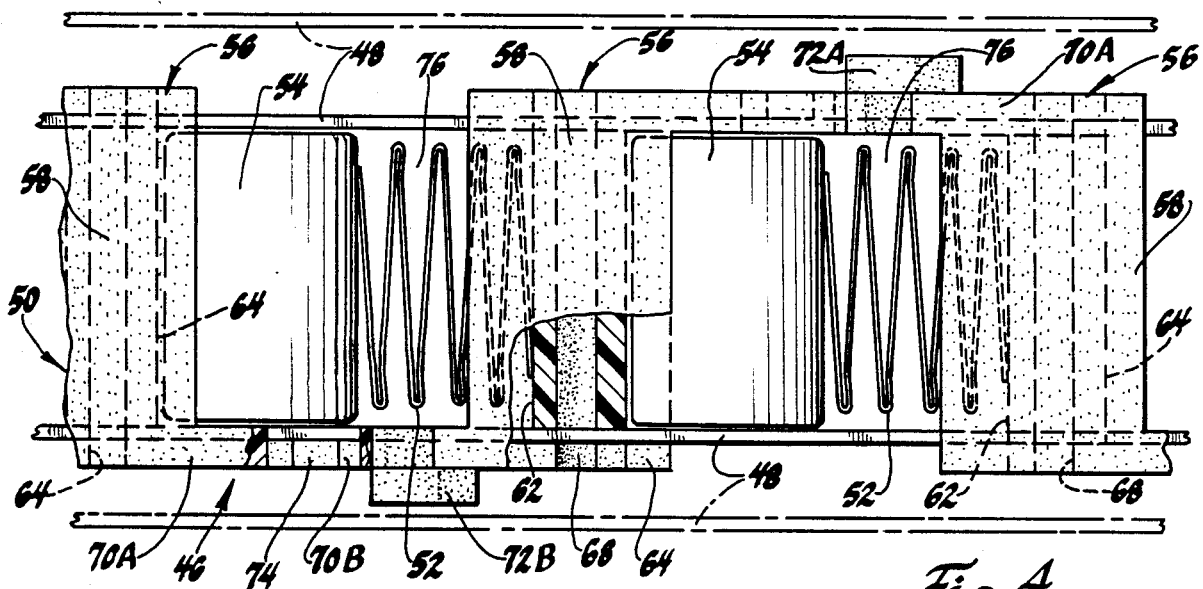
FIG. 4 is a top plan view of a portion of a second embodiment of the invention from a "rolled out" perspective, showing the pre-attachment position of a pair of metal end rings in dotted lines, and showing part of the cage broken away to illustrate underlying structure.

Referring next to FIGS. 4, 5 and 7, a second embodiment of the invention is designated generally at 46. The second embodiment is shown as it would appear before installation, but it would be used between races like the races 20 and 22 described above, which are therefore not separately illustrated. The second embodiment 46 includes a pair of metal end rings 48, in addition to a molded plastic cage, designated generally at 50. The cage 50 provides the same improved temperature tolerance and conformation as the first embodiment 10, and is also moldable. The metal end rings 48 provide additional advantages, however, which will be described below. The cage 50 serves as the main structural framework, providing a mount for energizing springs 52, as well as part of the retention pockets for rollers 54. Cage 50 is also made up of a plurality of circumferentially spaced plastic cage sections, but each of the cage sections is comprised simply of a single journal block, designated generally at 56. Each journal block 56 includes an upper surface 58 and a lower surface 60, which have generally the same configuration as, and serve the same purpose as, the upper and lower surfaces 30 and 32 of the cross bars 28 of the first embodiment's cage 12. The journal blocks 56 thus serve as the support portions of the cage 50, acting to keep the races 20 and 22 coaxial, as described above. In addition, each journal block 56 also includes a generally flat sided notch formed into one circumferentially facing side 62 thereof, which serves as a mount for a spring 52. Each journal block 56 also has a sloped sided notch formed into the other circumferentially facing side 64 thereof, which serves as a shipping rest surface for a roller 54. As with the first cage 12, the sides 62 and 64 of adjacent journal blocks 56 face one another in respective pairs, and their surfaces have no return bends relative to the axis of the cage 50. In addition, each axial end of each journal block 56 includes an arcuate groove 66, best seen in FIG. 7, for a purpose described below. Finally, each journal block 56 includes a passage 68 running axially therethrough to moderate the cooling and shrinkage of the plastic material during the molding process.

Referring now to FIGS. 4–7, the journal blocks 56, as with the cage sections of the first cage 12, are interconnected by connector members, which here comprise alternating double side rails 70A and 70B. The double side rails 70A and 70B are generally arcuate, as seen in FIG. 5, and are integrally molded to extend circumferentially between each pair of journal block sides 62 and 64. As best seen in FIG. 4, the alternating double side rails 70A and B, like the connector members 42 in the first cage 12, are axially spaced from one another and flexible. This allows the journal blocks 56 to similarly move circumferentially toward or away from one another to better conform to the annular space with changing temperature. Molded to the top rails 70A are alternating retention ears 72A and B, which operate like the ears 44A and B of the previous embodiment. All surfaces molded integrally with the double side rails 70A and B, as well as the journal blocks 56, have no return bends, and may likewise be molded by a mold having a single pair of axially parting mold elements. Additional structure of cage 12, moreover, cooperates with the metal end rings 48 to provide additional advantages. As best seen in FIG. 5, the arcuate spaces between the double side rails 70A and B, as well as the arcuate grooves 66, all lie on an annulus that generally matches the size of an end ring 48. Furthermore, each of the rails 70A and B is molded with a tab 74, which extend radially toward each other into the annulus described above, as best seen in FIG. 6. It may also be seen in FIG. 6 that each tab 74 has a chamfer, as do the edges of the rings 48. The end rings 48 may therefore be joined to the cage 50 by a snap fit into the arcuate grooves 66 and behind the tabs 74, which provide a latch. This snap fit is aided by the chamfers described above. The end rings 48 are held to the cage 50 in axial spaced relation securely enough to stay with the cage 50. However, the tabs 74 do not bear strongly enough on the rings 48 to prevent circumferential slip, and the groove 66, end ring 48 fit is not tight enough to bind. Therefore, the circumferential movement of the journal blocks 56 will not be interfered with. The plastic material of cage 50 provides good frictional characteristics, but may not provide sufficient roller wear resistance for all applications. However, as is best seen in FIG. 4, the end rings 48 provide, in cooperation with the journal blocks 56, a plurality of retention pockets 76 for the rollers 54 that are armored against wear by the ends of the rollers 54. Thus, the second embodiment 46 may be used in applications where a significant misalignment between the clutch races is possible, with attendant roller skew and potential wear of the roller ends against the cage side rails.

While two embodiments of the invention have been disclosed, it may be embodied in other structures, as well. For example, although the thermal expansion problem is especially acute in concentric control cages, the invention may still find utility in non-concentric control cages. While they do not fill the annular space as completely as do concentric control cages, they are still tied to, and thus near, one race, and so may still potentially bind one the surface of that one race. Cage sections of other configurations may be used, so long as the connector members are sufficiently flexible and located in the alternating fashion disclosed. Other means of latching the end rings to the cage may be provided, as well. Thus, it will be understood that the invention is not intended to be limited to just those embodiments disclosed.

The embodiments of the invention in which an exclusive property of privilege is claimed are defined as follows:

1. In an overrunning clutch of the type that has metal wedging elements and a cage that has plastic support portions adapted to fit closely within an annular space between confronting surfaces of a pair of metal rotatable members so as to maintain said rotatable members in coaxial relation to one another when said clutch overruns, said plastic having a thermal coefficient of expansion and contraction different from said metal rotatable members and a wear resistance less that said wedging elements, an improvement allowing the cage to be easily molded as a unitary structure from the same plastic material as said support portions, while conforming to said annular space with changing temperature without binding, in spite of said different coefficient, and also providing metal armored pockets for retaining said wedging elements, said improvement comprising, a plurality of cage sections formed of said plastic material and including said support portions, said cage sections being circumferentially spaced relative to one another, a plurality of alternating spaced connector members extending circumferentially between said cage sections to interconnect said cage sections and also formed of said plastic material, said connector members further being both sufficiently flexible and sufficiently axially spaced from one another so that, as said cage expands or contracts with changing temperature, said cage sections may in turn move circumferentially away from or toward one another with sufficient freedom that said cage will conform to said annular space without forcing said cage sections strongly into either of said confronting surfaces, thereby avoiding binding on either rotatable member, and, a pair of metal end rings adapted to be joined to said cage in axially spaced relation, thereby forming a plurality of circumferentially spaced armored wedging element retention pockets in cooperation with said cage sections, with said end rings further being joined to said cage sections so as to slip relative thereto when said cage sections move circumferentially toward or away from one another so as to not interfere with the conformation of said cage to said annular space.

* * * * *